Sept. 18, 1962  R. C. DICKINSON ETAL  3,054,874
METAL-CLAD SWITCHGEAR
Filed April 29, 1959

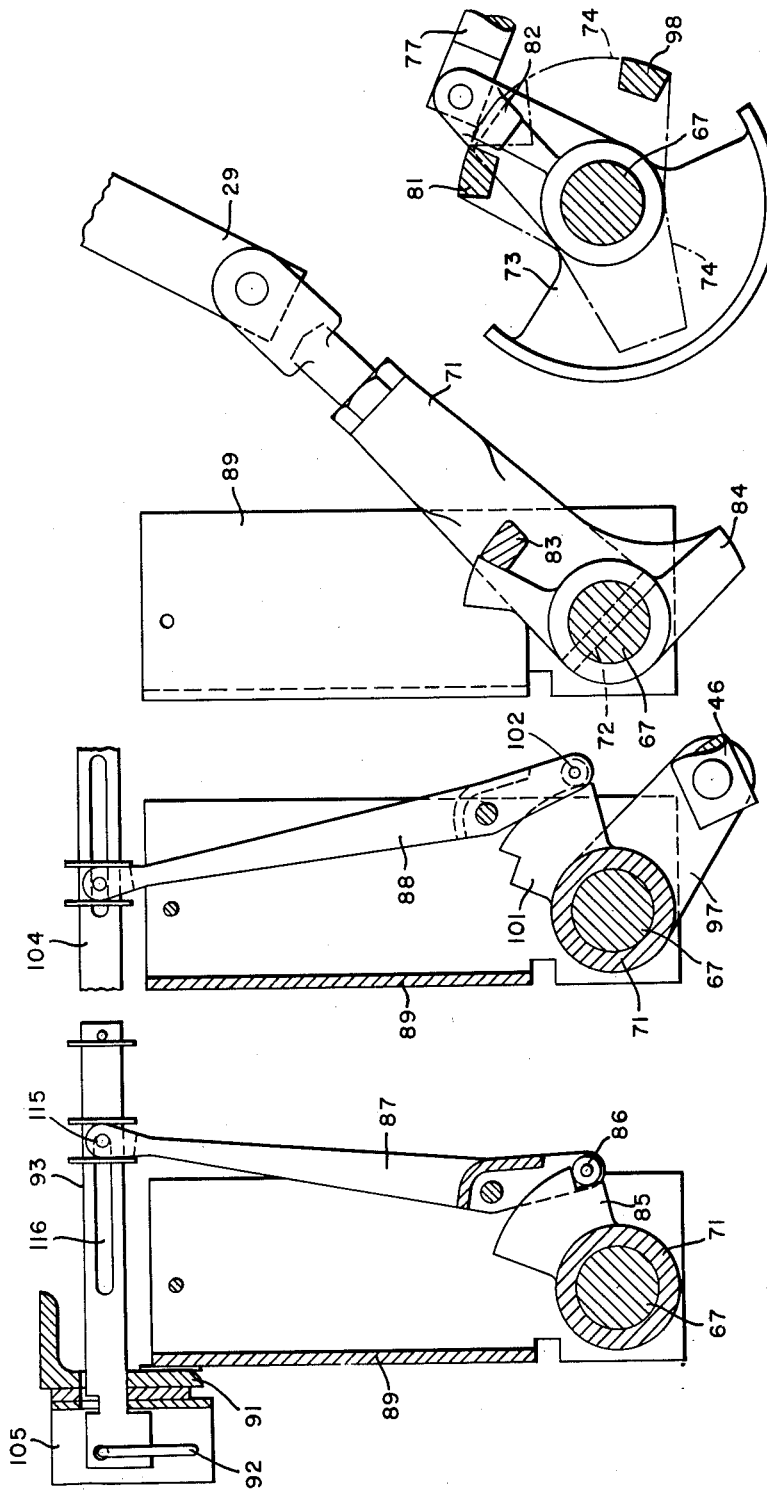

Sept. 18, 1962 R. C. DICKINSON ETAL 3,054,874
METAL-CLAD SWITCHGEAR
Filed April 29, 1959 4 Sheets-Sheet 4
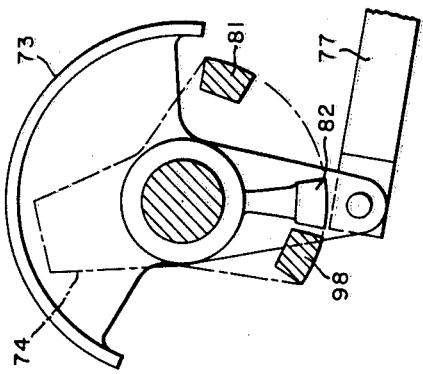
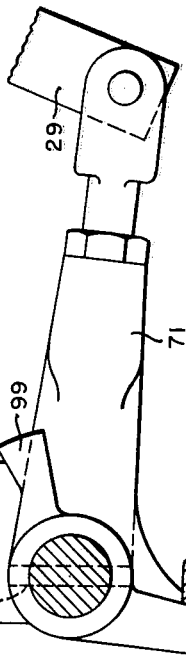
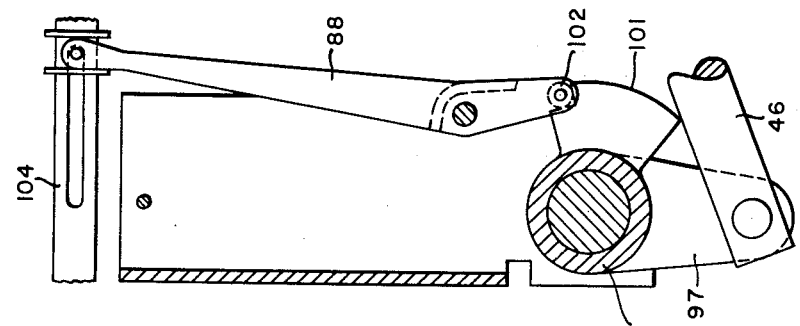
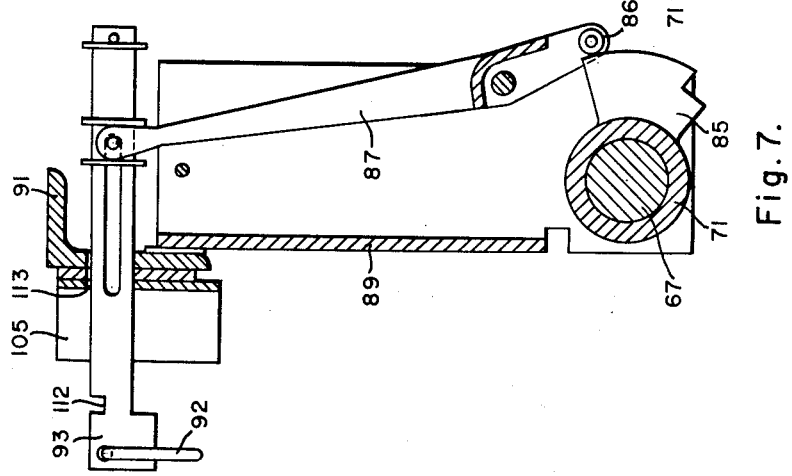

United States Patent Office 3,054,874
Patented Sept. 18, 1962

3,054,874
METAL-CLAD SWITCHGEAR
Robert C. Dickinson and Paul Olsson, Penn Hills Township, Allegheny County, Pa., assignors to Westinghouse Electric Corporation, East Pittsburgh, Pa., a corporation of Pennsylvania
Filed Apr. 29, 1959, Ser. No. 809,649
8 Claims. (Cl. 200—114)

This invention relates, generally, to metal-clad switchgear and, more particularly, to switchgear having removable switch units disposed in cells or housings.

In electric power distribution systems it is sometimes desirable, for reasons of economy, to connect relatively low power transformers to high power systems through a protective device having a low cost and being of simple construction and operation. Thus, the use of an automatic circuit breaker as the protective device is precluded because of its cost. Heretofore, a high power fuse has been provided for opening heavy faults on the system and a load-break disconnecting switch has been provided for isolating the transformer. These have been mounted on stationary mountings.

With the increasing use of metal-clad switchgear, a circuit breaker of the withdrawable type has been found to provide flexibility and economy of operation. Therefore, it is desirable to provide a withdrawable unit equipped with a power fuse and a load-break switch for utilization in an electric distribution system.

An object of the invention is to provide a drawout switch and fuse unit which is interchangeable with a drawout circuit breaker unit in a switchgear cell.

A further object of the invention is to isolate the fuses from the disconnect switches in a multi-pole drawout switch and fuse unit.

Another object of the invention is to provide a stored energy operating mechanism for quickly opening and quickly closing the disconnect switches on the drawout unit.

A still further object of the invention is to prevent premature opening of the disconnect switches when closed against a fault, thereby preventing the switches from interrupting a fault current.

Other objects of the invention will be explained fully hereinafter or will be apparent to those skilled in the art.

In accordance with one embodiment of the invention, a series-connected power fuse and a load-break disconnect switch are provided for each phase of a three-phase circuit. The fuses and switches are mounted on a drawout truck which is interchangeable with a drawout circuit breaker truck in a metal-clad switchgear cell. The fuses are isolated from the switches by barriers and the switches are isolated by phase barriers. A single manually charged spring is utilized to open and close the switches and a manually operated time delay device prevents the switches from being reopened immediately after being closed, thereby giving the fuses time to interrupt the circuit in case the switches are closed against a low-current fault.

For a better understanding of the nature and objects of the invention, reference may be had to the following detailed description, taken in conjunction with the accompanying drawings, in which.

Figure 2:
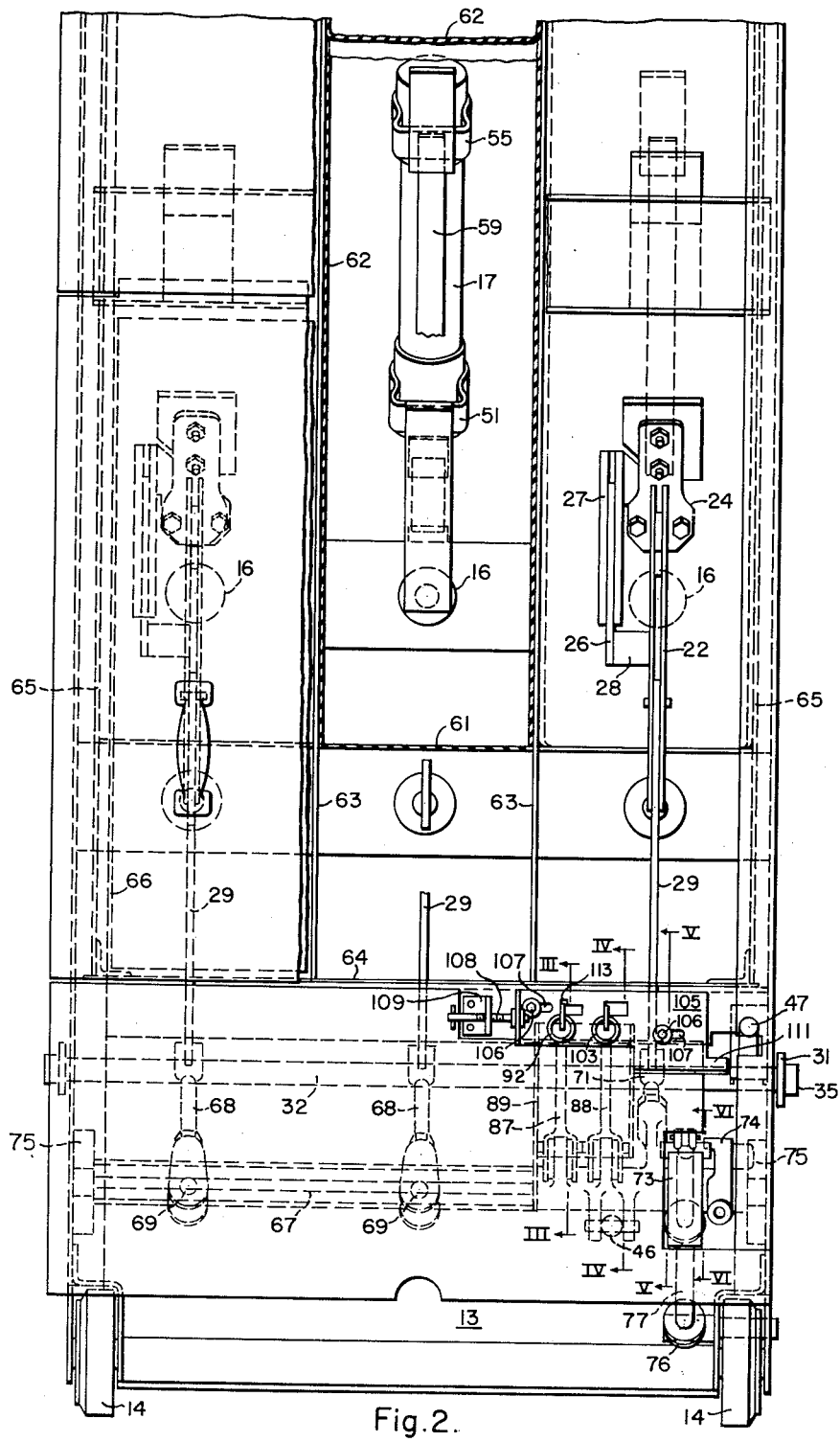
FIG. 2 is a view, partly in front elevation and partly in section, of the drawout unit shown in FIG. 1.

FIGS. 3, 4, 5 and 6 are enlarged views, in section, taken generally along the lines III—III, IV—IV, V—V and VI—VI, respectively, in FIG. 2, showing parts of the operating mechanism in the closed position of the switch, and FIGS. 7, 8, 9 and 10 are views corresponding to FIGS. 3, 4, 5 and 6, respectively, showing the parts of the operating mechanism in the open position of the switch.

Figure 1:
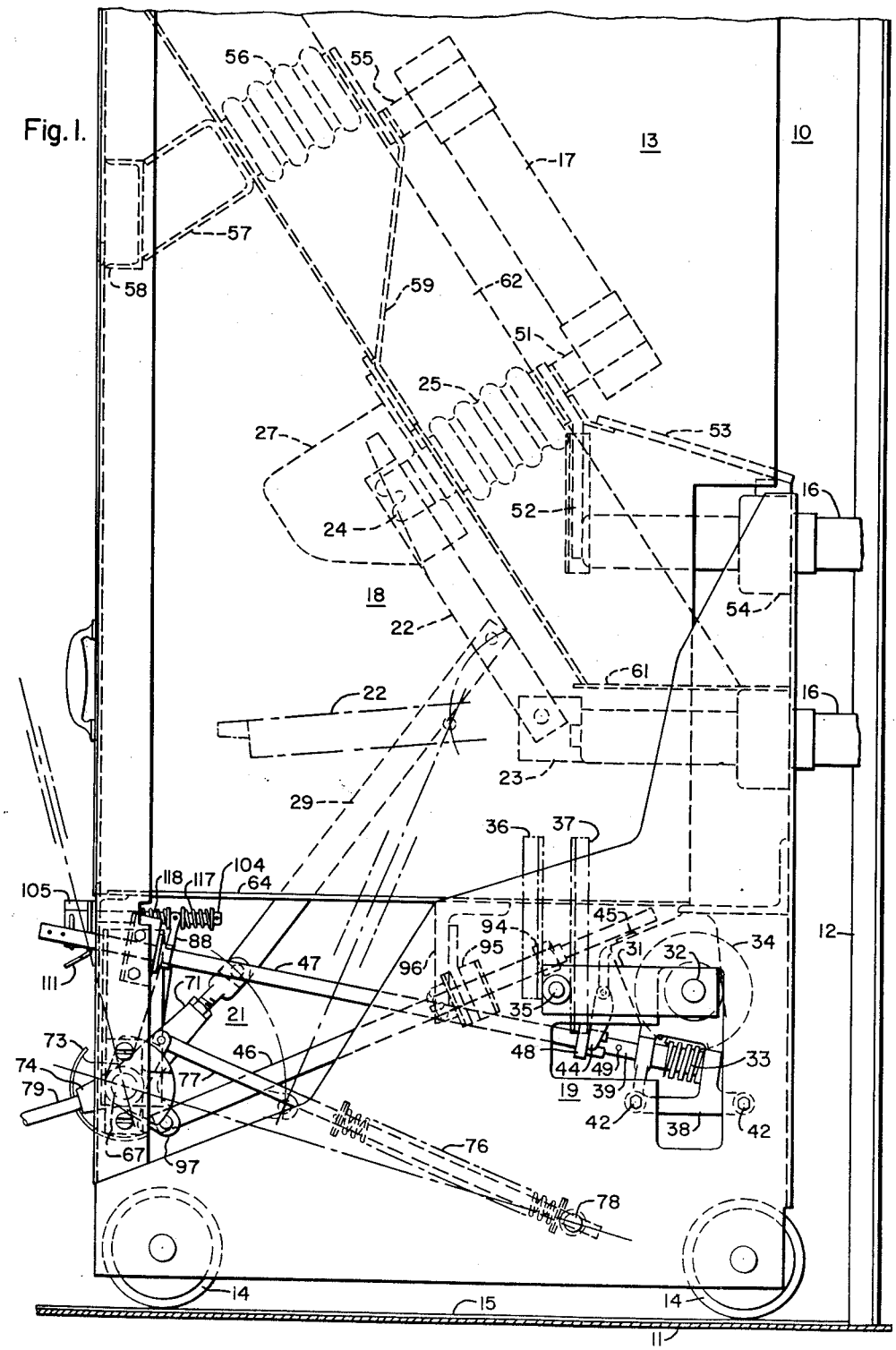
FIGURE 1 is a view, in side elevation, of a drawout switchgear unit embodying the principal features of the invention.

Referring to the drawings, and particularly to FIGURE 1, the structure shown therein comprises a portion of a metal-clad switchgear cell or housing 10 which may be constructed by securing sheet metal members 11 to angle frame members 12 in a manner well known in the art. A drawout unit 13 is disposed in the cell and may be moved horizontally into and out of the cell on wheels 14 which run on rails 15 disposed at the bottom of the cell. The drawout unit 13 is preferably interchangeable with removable circuit breaker units utilized in metal-clad switchgear.

As shown, the drawout unit is provided with primary disconnecting contact members 16 which are disposed to engage stationary contact members (not shown) mounted in the cell. The disconnecting contact members may be of the type described in Patent 2,376,818, issued May 22, 1945 to M. J. Rubel.

As also shown, the drawout unit 13 is provided with three power fuses 17, a three-pole disconnecting switch 18, a levering and interlocking mechanism 19 for mechanically moving the drawout unit 13 between the operating or connected position and the test or disconnected position within the cell 10, and an operating mechanism 21 for opening and closing the disconnecting switch 18. The fuses 17 are preferably of the current limiting type and are capable of interrupting relatively large amounts of current. The disconnecting switch 18 is preferably of the load-break type.

As shown, each pole of the disconnecting switch comprises a blade member 22 which is hinged on a contact member 23 secured to the inner end of the lower primary disconnecting contact 16. The upper end of the blade 22 engages a fixed contact member 24 which is supported by an insulator 25. An auxiliary switch blade 26 is disposed in an arc chute 27 and is pivotally attached to the main blade 22 through a spacer 28. The auxiliary blade 26 functions to interrupt arcs drawn during opening of the switch in a manner well known in the art. The switch blades 22 are connected to the operating mechanism 21 by insulating pull rods 29, as will be described more fully hereinafter.

The combined levering and interlocking mechanism 19 may be of the type described in a copending application of R. E. Frink and Paul Olsson, Serial No. 725,287, now Patent No. 2,900,464, filed March 31, 1958 and issued August 18, 1959 as U.S. Patent 2,900,464. Generally, the levering mechanism comprises a pair of lever arms 31 which are secured to opposite ends of a horizontal shaft 32 rotatably mounted in the drawout unit. The shaft 32 is rotated by a worm 33 and a worm gear 34 which is secured to the shaft 32. The worm 33 is driven in a manner which will be described more fully hereinafter.

A roller 35 is provided at the end of each one of the lever arms 31 and is disposed in a slot provided between angle members 36 and 37 which are secured to a channel member (not shown) which, in turn, is secured to angle frame members 12 at the side of the cell structure. Since a lever arm 31 and cooperating angle members 36 and 37 are provided at opposite sides of the breaker unit, a levering force is applied at both sides of the breaker unit.

It will be seen that when the shaft 32 is rotated to drive the arms 31 in a clockwise direction, as viewed in FIGURE 1, the rollers 35 move in the slots between the members 36 and 37, which, as previously explained, are secured to the sides of the cell structure, thereby moving the drawout unit from the connected position to the test position in the cell. When the shaft 32 is rotated in the opposite direction, force is applied through the arm 31 to move the drawout unit from the test position to the connected position shown in the drawing.

As previously stated, the one lever arm 31 and the worm gear 34 are both secured to one end of the shaft 32, preferably by welding. A gear housing 38, which is mounted on the shaft 32 before the worm gear 34 and the arm 31 are welded in place, carries the worm 33 which is secured to a worm shaft 39 rotatably mounted in the housing 38. A gear housing 38 may be attached to the sides of the drawout unit 13 by means of bolts 42 as shown in FIGURE 1.

As fully described in the aforesaid copending application, an interlocking lever 44 is pivotally mounted in the gear housing 38. The lever 44 and a spring-biased interlocking pin 45 cooperate with an interlocking rod 46 to prevent operation of the levering mechanism while the contact members of the disconnecting switch 18 are closed. The interlocking members also prevent closing the contact members of the switch while the drawout unit is at any position between the test and the connected position.

The levering mechanism is operated by a shaft 47 which is rotatably mounted in the drawout unit and is movable longitudinally of the shaft. A coupling member 48, which is secured to the inner end of the shaft 47, engages a pin 49 in the worm shaft 39 when the shaft 47 is pushed inwardly. The shaft 47 may be rotated by means of a manually operable crank (not shown) attached to the outer end of the shaft 47.

As shown most clearly in FIGURE 1, the lower end of each fuse 17 is mounted in a fuse clip 51 attached to the insulator 25. The insulator 25 is supported by a conductor 52 which is connected to the inner end of the upper primary disconnecting contact 16. One end of an insulating brace 53 is attached to the conductor 52 and the other end of the brace is attached to a bushing support 54 which supports the primary disconnecting contact 16. The upper end of the fuse 17 is mounted in a fuse clip 55 which is attached to an insulator 56. The insulator 56 is supported by a bracket 57 which is attached to a channel member 58 of the drawout unit 13. A conductor 59 connects the upper fuse clip 55 to the fixed contact member 24 of the disconnecting switch 18. In this manner, one of the fuses 17 is connected in series-circuit relation with each pole of the disconnecting switch 18.

As shown, the fuses 17 are isolated from the disconnecting switch by an insulating barrier 61 and three generally channel shaped insulating barriers 62, there being one channel shaped barrier 62 for each fuse 17. The three poles of the disconnecting switch are isolated from each other by insulating barriers 63, and an insulating barrier 64 separates the switch compartment from the operating compartment. Additional insulating barriers 65 are provided at the outer sides of the switch compartment, and a barrier 66 is provided at the front of the switch compartment. In this manner, the fuses 17 are isolated from the disconnecting switch 18, and the three poles of the disconnecting switch are separated from each other. Furthermore, the switch is separated from the operating mechanism.

Thus, if the load-break switch is operated beyond its interrupting ability and fails, or fails to interrupt for any other reason, and flashes to ground, a system fault will result and blow the fuse. The isolating barriers will confine the ionized gases resulting from the switch fault so that the fuse insulators will not be flashed over and the circuit will therefore remain interrupted without further damage to the unit. As previously explained, the fuses are connected between the source of power and the load-break switch.

As also previously explained, each switch blade 22 is connected to the operating mechanism 21 by means of the insulating pull rod 29. As shown most clearly in FIG. 2, an operating shaft 67 is rotatably mounted in the drawout unit. Two switch operating levers 68 are clamped to the shaft 67 by clamping bolts 69. A third switch operating lever 71 is secured to the shaft 67 by means of a pin 72 as shown most clearly in FIGS. 5 and 9. Thus, the switch operating levers 68 and 71 rotate with the shaft 67. Each one of the insulating pull rods 29 is adjustably attached to one of the switch operating levers. Thus, the switch blades 22 are opened and closed by rotating the shaft 67.

A spring lever 73 is mounted on the shaft 67 adjacent to the switch lever 71 and a hand operating lever 74 is mounted on the shaft 67 adjacent to the spring lever 73. The spring lever 73 and the hand operating lever 74 are free to rotate on the shaft 67. The ends of the shaft 67 are rotatably mounted in bearing blocks 75 attached to the frame of the drawout unit 13.

The energy for operating the switch during both opening and closing is stored in an energy-storing device, such as a compression spring 76. The spring 76 is disposed on a shaft 77. As shown most clearly in FIG. 1, one end of the shaft 77 is pivotally connected to the spring lever 73. The other end of the shaft 77 is pivotally and slidably disposed in a pin 78 on one side of the drawout unit.

In the drawings, the switch is shown closed and the spring 76 is discharged. That is, the energy of the spring has been discharged by its action in closing the switch.

The first step in opening the switch is to charge or compress the spring 76. This is done by inserting a handle 79 in the hand operating lever 74 and lifting up on the handle, thereby rotating the lever 74 clockwise as viewed in FIGS. 1 and 6 of the drawing. Clockwise rotation of the lever 74 causes a laterally extending projection 81 on the lever 74 to engage a projection 82 on the spring lever 73. Thus, the spring lever is rotated to compress the spring 76 until the shaft 77 reaches the center line between the pin 78 and the shaft 67. Continued movement discharges the spring slightly until a projection 83 on the spring lever 73 engages an arm 84 on the switch lever 71. This biases a cam 85 on the lever 71 against a roller 86 on a trip lever 87. The trip lever 87 and a similar trip lever 88 are pivotally mounted on a bracket 89 which is attached to a cross member 91 of the drawout unit as shown in FIGS. 3 and 4. This completes charging the spring preparatory to opening the switch.

In order to open the switch, a ring 92 on a releasing member 93 is pulled, thereby actuating the trip lever 87 about its pivot point to disengage the roller 86 from the cam 85. The spring 76 then drives the switch lever 71 and the shaft 67 clockwise until a nut 94 on the interlocking rod 46 engages a bumper bearing plate 95. The bumper bearing plate 95 is attached to a cross member 96 of the drawout unit 13. The one end of the interlocking rod 46 is attached to an arm 97 of the switch lever 71. Thus, the switch blades 22 are actuated to their open position are shown by the dot-dash lines in FIG. 1.

In order to close the switch it is necessary to recharge the spring 76. The spring is recharged by rotating the hand-operating lever 74 counterclockwise by moving the handle 79 downwardly. As shown in FIG. 10, when the lever 74 is rotated counterclockwise a projection 98 engages the projection 82 on the spring lever 73, thereby rotating the spring lever counterclockwise. The spring is compressed until the shaft 77 passes dead center and the projection 83 on the spring lever 73 engages an arm 99 on the switch lever 71. This biases a cam 101 on the switch lever 71 against a roller 102 on the trip lever 88 as shown in FIG. 8. In order to close the switch, a ring 103 is pulled forwardly to move a release member 104 and actuate the trip lever 88 about its pivot point to disengage the roller 102 from the cam 101. The energy of the spring 76 is thereby released to drive the shaft 67 counterclockwise and close the blades of the switch.

In order to prevent the switch from being opened immediately after closing, a time delay is introduced between the closing of the switch and the opening of the switch. This time delay is desirable because if the switch is closed against a relatively low current fault, but which is higher than the switch interrupting rating, the fuse will require a relatively long time to clear the circuit. If the switch is reopened too quickly, an arc will be drawn in it which exceeds its interrupting ability.

The time delay between closing and opening is obtained by means of a time delay device which in this case comprises an interlocking plate 105 slidably mounted on two bolts 106 which extend through elongated slots 107 in the plate 105. The plate 105 may be moved to the left or right by means of a screw 108 which is threaded through an angle shaped supporting bracket 109 and is rotatably attached to an angle projection on one end of the plate 105. When the plate 105 is in the position shown in the drawing, a projection 111 on the other end of the plate prevents the handle 79 from being raised high enough to move the spring shaft 77 past the dead center position.

Therefore, it is necessary to move the plate 105 to the left by turning the screw 108 counterclockwise in order to charge the spring 76 to open the disconnect switch. After the spring 76 is charged and the handle 79 removed from the hand operating lever 74, the plate 105 must be moved to the right to the position shown in the drawing to permit the releasing member 93 to be pulled forwardly by means of the ring 92 to release the trip lever 87 and permit the spring 76 to be discharged to open the switch. The time required to return the plate 105 from its position at the left to the position shown in the drawing by means of the screw 108 introduces the necessary time interval between closing the switch and opening the switch to permit the fuse to open the circuit in case the switch is closed against an overload current.

The releasing member 93 is provided with a notch 112 which cooperates with a notch 113 in the plate 105 to permit the member 93 to be pulled through the plate 105 when it is in the position shown in the drawing, but prevents the member 93 from being pulled forwardly through the plate 105 when the plate 105 is moved to the left to permit the projection 111 to clear the handle 79. The plate 105 does not interfere with the operation of the trip lever 88 and the releasing member 104 which is pulled by means of the ring 103 to close the switch. Thus, the switch can be closed at any time regardless of the position of the plate 105.

As shown in FIG. 3, the upper end of the trip lever 87 is attached to the releasing member 93 by means of a pin 115 which is disposed in an elongated slot 116 in the member 93. The trip lever 88 is attached to the releasing member 104 in a similar manner. As shown in FIG. 1, springs 117 and 118 are disposed on the releasing members at opposite sides of the trip levers. Thus, the rollers on the trip levers are permitted to ride up over the cam surfaces on the switch lever 71 when required to do so during operation of the switch.

The releasing members 93 and 104 may be actuated by electromagnets to release the trip levers by remote control. Thus, two of these fused switch units may be used to transfer from one power source to another automatically in case of failure of the first source of power. In order to do this the spring 76 of the closed switch is charged to open that switch and the spring of the open switch is charged to close it. When transfer is desired, the electromagnet for actuating the trip lever of the first unit is energized to open that switch and an interlocking contact member energizes the electromagnet for actuating the trip lever of the second switch, thereby permitting this switch to close and effect the transfer. The energization of the electromagnets may be controlled manually, or in case automatic operation is desired, the energization of the first magnet may be controlled by a relay responsive to the failure of the first source of power.

From the foregoing description it is apparent that the present invention provides a drawout switch and fuse unit which is interchangeable in a switchgear cell with a drawout circuit breaker unit. The present drawout unit is levered into the connected position in the cell in the same manner as a drawout circuit breaker unit. The stored energy operating mechanism provides positive and safe opening and closing of the switch independently of the operator. After closing, the operating spring must be recharged before the switch can be reopened. A time delay prevents a premature opening of the device when closed against a fault. The delay permits the fuse to safely interrupt the fault current. Insulating barriers isolate the phases of the switch unit. Insulating barriers are also provided between the switch and fuse element to reduce the possibility of a fault in one jeopardizing the other. The present unit may be economically manufactured and is suitable for protecting circuits where the expense of installing a circuit breaker unit is not justified.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a switchgear structure, in combination, a cell, a drawout unit having a switch thereon disposed in the cell, one stored-energy means for both opening and closing the switch, manually operable means for charging said stored-energy means, separately controlled means for releasing said stored-energy means after it is charged, and time delay means for delaying the recharging of the stored-energy means after a closing operation to prevent reopening the switch immediately after closing.

2. In a switchgear structure, in combination, a cell, a drawout unit having a switch and a fuse thereon, said fuse being connected in series-circuit relation with the switch, an insulating barrier separating the fuse from the switch, a spring for both opening and closing the switch, manually operable means for charging the spring, manually controlled means for releasing the spring after it is charged, and time delay means for delaying the recharging of the spring after a closing operation to prevent reopening the switch immediately after closing.

3. In a switchgear structure, in combination, a cell, a drawout unit having a switch and a fuse thereon, said fuse being connected in series-circuit relation with the switch, one stored-energy means for both opening and closing the switch, manually operable means for charging the stored-energy means, manually controlled means for releasing the stored-energy means, and a time delay device for controlling the operation of the means for charging the stored-energy means thereby preventing the reopening of the switch immediately after closing.

4. In a switchgear structure, in combination, a cell, a drawout unit having a switch and a fuse thereon, said fuse being connected in series-circuit relation with the switch, a spring for both opening and closing the switch, manually operable means for charging the spring, manually controlled means for releasing the spring, and a manually operable device cooperating with said manually operable means and said manually controlled means in delaying the opening of the switch after closing the switch.

5. In a multi-phase switchgear structure, in combination, a cell, a drawout unit having a multipole switch thereon disposed in the cell, a fuse connected in series-circuit relation with each pole of the switch, insulating barriers separating the fuses from the switch members, additional insulating barriers separating the poles of the switch, an operating shaft rotatably mounted on the drawout unit, a switch lever for each pole of the switch secured to the shaft, a spring for rotating the shaft both to open and close the poles of the switch simultaneously, manually operable means for charging the spring, means for releasing the spring to rotate the shaft and time delay means cooperating with the spring charging means and spring releasing means to prevent reopening the switch immediately after closing.

6. In a multi-phase switchgear structure, in combination, a cell, a multi-pole switch disposed in the cell, an operating shaft rotatably mounted in the cell, a switch lever for each pole of the switch secured to said shaft, a spring lever rotatably mounted on the shaft, a hand operating lever rotatably mounted on the shaft adjacent to the spring lever, a spring shaft attached to the spring lever, a spring disposed on the spring shaft, said hand operating lever being rotatable to drive the spring lever to charge the spring, said spring lever engaging one of said switch levers to rotate the operating shaft when the spring is released, and manually controlled means for releasing the spring.

7. In a multi-phase switchgear structure, in combination, a cell, a multi-pole switch disposed in the cell, an operating shaft rotatably mounted in the cell, a switch lever for each pole of the switch secured to said shaft, a spring lever rotatably mounted on the shaft, a hand operating lever rotatably mounted on the shaft adjacent to the spring lever, a spring shaft attached to the spring lever, a spring disposed on the spring shaft, said hand operating lever being rotatable to drive the spring lever to compress the spring on the spring shaft, said spring lever engaging one of said switch levers to rotate the operating shaft in one direction to open the switch and in the opposite direction to close the switch when the spring is released, and tripping means for releasing the spring.

8. In a multi-phase switchgear structure, in combination, a cell, a multi-pole switch disposed in the cell, an operating shaft rotatably mounted in the cell, a switch lever for each pole of the switch secured to said shaft, a spring lever rotatably mounted on the shaft, a hand operating lever rotatably mounted on the shaft adjacent to the spring lever, a spring shaft attached to the spring lever, a spring disposed on the spring shaft, said hand operating lever being rotatable to drive the spring lever to compress the spring on the spring shaft, said spring lever engaging one of said switch levers to rotate the operating shaft in one direction to open the switch and in the opposite direction to close the switch when the spring is released, a trip lever for releasing the spring to open the switch, and another trip lever for releasing the spring to close the switch.

References Cited in the file of this patent
UNITED STATES PATENTS

| | | |
|---|---|---|
| 2,043,306 | Sandin | June 9, 1936 |
| 2,426,880 | Jackson et al. | Sept. 2, 1947 |
| 2,443,664 | Rothfus | June 22, 1948 |
| 2,644,053 | Lingal et al. | June 30, 1953 |
| 2,735,042 | Hayford et al. | Feb. 14, 1956 |
| 2,769,874 | Goggeshall | Nov. 6, 1956 |
| 2,781,427 | Rudolph | Feb. 12, 1957 |
| 2,914,635 | Lester et al. | Nov. 24, 1959 |